United States Patent
Oughton, Jr.

[11] Patent Number: 6,122,181
[45] Date of Patent: Sep. 19, 2000

[54] SYSTEMS AND METHODS FOR PRODUCING STANDBY UNINTERRUPTIBLE POWER FOR AC LOADS USING RECTIFIED AC AND BATTERY

[75] Inventor: George W. Oughton, Jr., Raleigh, N.C.

[73] Assignee: Exide Electronics Corporation, Raleigh, N.C.

[21] Appl. No.: 09/082,850

[22] Filed: May 21, 1998

[51] Int. Cl.$^7$ .............................. H02M 5/45; H02M 3/00
[52] U.S. Cl. ................................. 363/37; 363/34; 307/66
[58] Field of Search .................................. 363/34, 37, 43, 363/45, 46; 307/66, 64; 320/120, 114

[56] References Cited

U.S. PATENT DOCUMENTS

| | | | |
|---|---|---|---|
| 3,573,483 | 4/1971 | White | 307/66 |
| 3,599,073 | 8/1971 | Wilson | 320/144 |
| 4,441,031 | 4/1984 | Moriya et al. | 307/66 |
| 4,642,475 | 2/1987 | Fischer et al. | 307/66 |
| 4,709,318 | 11/1987 | Gephart et al. | 363/37 |
| 4,788,450 | 11/1988 | Wagner | 307/64 |
| 5,057,698 | 10/1991 | Widener et al. | 307/66 |
| 5,291,383 | 3/1994 | Oughton | 363/17 |
| 5,513,088 | 4/1996 | Williamson | 363/20 |

FOREIGN PATENT DOCUMENTS 09093833  4/1997  Japan .

OTHER PUBLICATIONS

International Search Report, PCT/US99/05605, Jul. 5, 1999.

*Primary Examiner*—Peter S. Wong
*Assistant Examiner*—Rajnikant B. Patel
*Attorney, Agent, or Firm*—Myers Bigel Sibley & Sajovec

[57] ABSTRACT

Systems and methods for producing standby uninterruptible power for an AC load rectify an AC utility input voltage to produce a rectified voltage and activate a DC battery voltage in response to a change in the AC utility input voltage to thereby produce a standby DC voltage. The rectified voltage and the standby DC voltage are connected to an AC load that includes input rectification to thereby produce standby uninterruptible power without the need for costly, bulky, and/or unreliable inverters or converters. Seamless transfer of power may be provided to support the AC load upon failure of the AC utility input voltage and upon restoration of the AC utility input voltage. The AC utility input voltage is preferably rectified by a diode rectifier, most preferably a full-wave diode rectifier including at least four diodes, to produce the rectified voltage. A diode switch is used to activate the DC voltage from the battery in response to a change in the AC utility input voltage to thereby produce the standby DC voltage. The diode switch may include a separate diode and an electronic or electromechanical switch. Alternatively, the diode switch may be a single element such as a thyristor. The diode rectifier and the diode and switch are connected in a diode-OR connection that provides the standby uninterruptible power for the output of the UPS. The diode-OR connection allows the strongest source to support the AC load at all times.

62 Claims, 8 Drawing Sheets

| FIG. 3A |
| FIG. 3B |

SYSTEMS AND METHODS FOR PRODUCING STANDBY UNINTERRUPTIBLE POWER FOR AC LOADS USING RECTIFIED AC AND BATTERY

FIELD OF THE INVENTION

This invention relates to power supplies and more particularly to systems and methods for producing standby uninterruptible power.

BACKGROUND OF THE INVENTION

Uninterruptible Power Supplies (UPS) are widely used to provide power to electronic components in the event that the alternating current (AC) utility input voltage fails. UPSs are now widely used, for example with computers, including but not limited to personal computers, workstations, mini computers, and mainframe computers, to insure that valuable data is not lost and that the computer can continue to operate notwithstanding temporary loss of the AC utility input voltage.

Figure 1A:
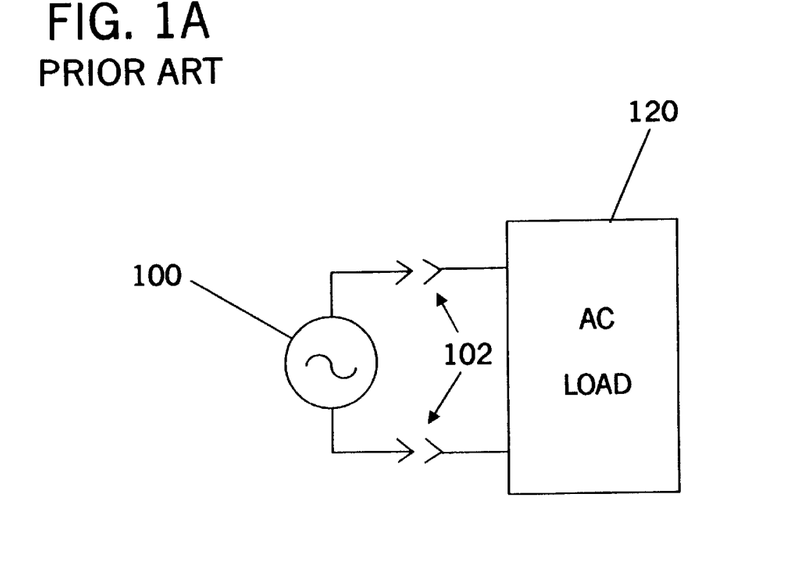
FIG. 1A is a simplified block diagram of a conventional AC load powered by an AC utility input voltage.

Referring to FIG. 1A, a simplified block diagram of an AC load powered by an AC utility input voltage is shown. As shown in FIG. 1, AC utility input voltage 100 is supplied to first plug 102 such as a wall socket into which an AC load 120 is plugged. In this conventional arrangement, if the AC utility input voltage fails, operation of the AC load 120 may stop.

Figure 1B:
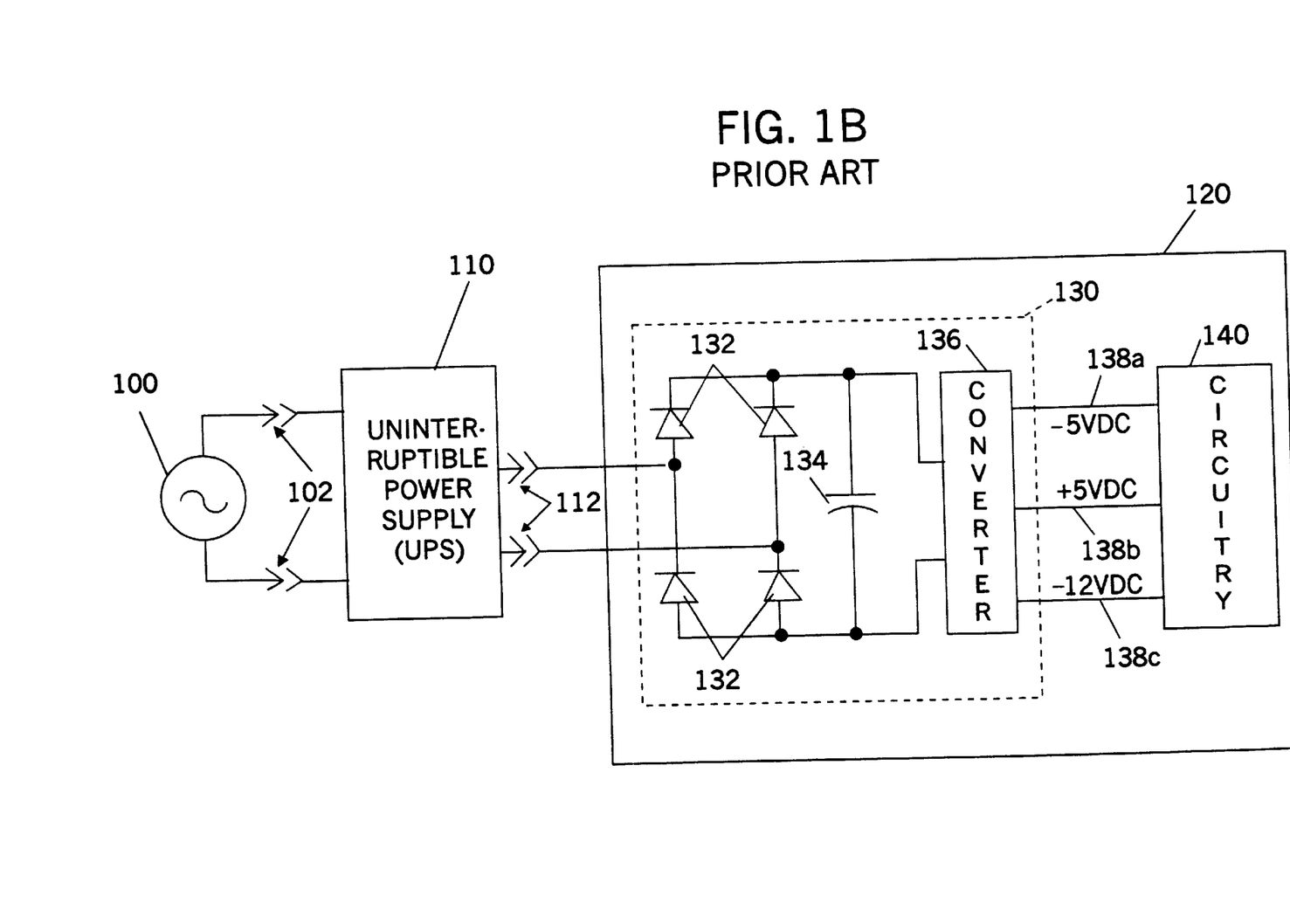
FIG. 1B is a simplified block diagram of a conventional UPS that is inserted between an AC utility input voltage and an AC load.

Referring now to FIG. 1B, an uninterruptible power supply 110 is inserted between the first plug 102 of the AC utility input voltage 100 and the AC load 120. It will be understood that the UPS may be external to the AC load 120 so that the UPS 110 and AC load 120 are connected by a second plug 112 as shown in FIG. 1B. Alternatively, the UPS 110 may be integrally included as part of the AC load 120.

FIG. 1B also illustrates details of an AC load 120 that includes electronic circuitry. It will be understood by those having skill in the art that some AC loads, such as AC motors, can directly operate on the AC current that is provided by the UPS. However, when the AC load includes electronic circuitry 140, the electronic circuitry typically operates from one or more direct current (DC) operational voltages. Thus, as shown in FIG. 1B, the electronic circuitry 140 operates from three DC operational voltages 138a–138c at −5 volts DC, +5 volts DC, and −12 volts DC respectively. Other DC operational voltages may be used. It will be understood that electronic circuitry 140 can be a personal computer, workstation, minicomputer, mainframe computer, or any other consumer, commercial, or military electronic product.

In order to supply the DC operational voltages 138a–138c, a power supply 130 converts the AC current produced by UPS 110 into the DC operational voltages 138a–138c for electronic circuitry 140. Accordingly, power supply 130 typically includes input rectification, for example as provided by full-wave rectifying diodes 132, that produce a rectified voltage. It will also be understood by those having skill in the art that half-wave input rectification or other forms of input for rectification may also be used. A capacitor 134 may be used to filter the rectified voltage from full-wave rectifying diodes 132. The filtered voltage is provided to DC to DC converter 136. DC to DC converter 136 may include a boost converter and/or a high frequency converter, as is well known to those having skill in the art. A boost converter may be included to provide power factor correction and to reduce total harmonic distortion in the input AC line current. The design of power supply 130 is well known to those having skill in the art and need not be described further herein.

UPSs may be generally classified into online UPSs and standby UPSs. In an online UPS, a battery is used to power the AC load via a DC to AC inverter. An AC to DC converter (also referred to as a "charger") maintains the battery in its charged state. Since the battery is always powering the AC load, there need be no transition when the AC utility input voltage fails. Moreover, the battery can filter distortion or noise in the AC utility input voltage to thereby reduce "let through" to the AC load. Unfortunately, online UPSs may require a large battery, an AC to DC converter and a DC to AC inverter. Accordingly, online UPSs may be expensive and bulky.

In contrast, a standby UPS powers the AC load from the AC utility input voltage until the AC utility input voltage fails. A battery and inverter are then switched in to thereby power the AC load. The battery and inverter therefore only power the AC load on a standby basis.

Figure 2:
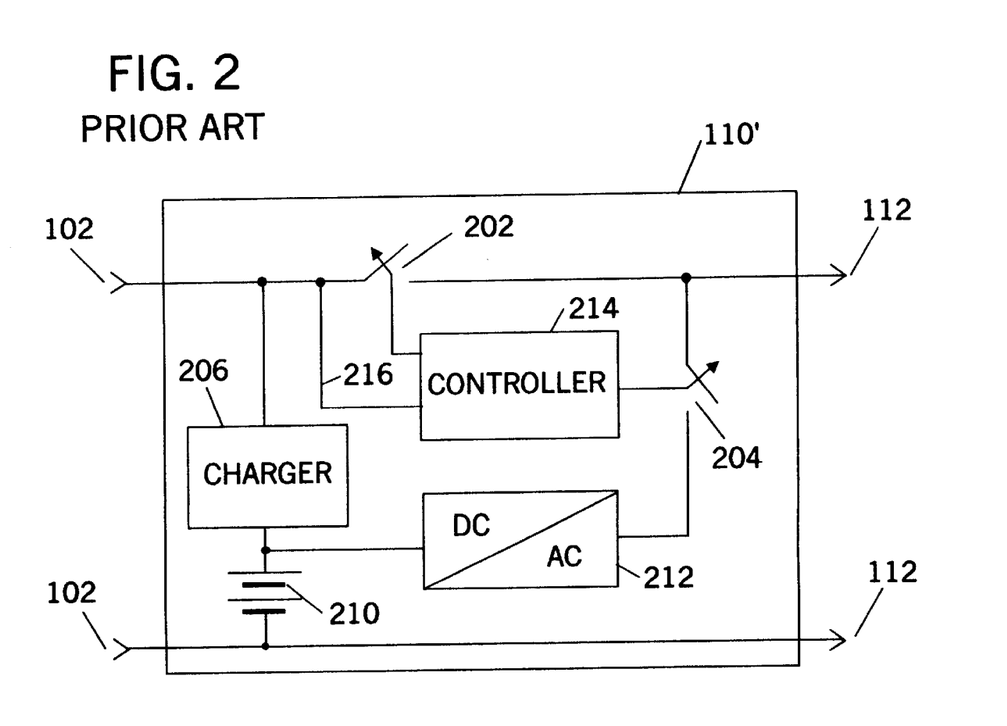
FIG. 2 is a block diagram of a conventional UPS.

FIG. 2 is a block diagram of a conventional standby UPS. As shown in FIG. 2, standby UPS 110' accepts the AC utility input voltage 100 from first plug 102 and feeds the AC utility input voltage to an AC load via the second plug 112 through a first switch 202. The first switch 202 may be a relay and/or a thyristor (triac) that remains closed as long as the AC utility input voltage is supplied to the first plug 102. Upon loss of the AC utility input voltage 100, the first switch 202 is opened. The first switch 202 may open due to its normally open configuration, or under the control of controller 214. The second switch 204 is then closed by controller 214. By closing the second switch 204, a DC to AC inverter 212 provides AC power from the battery 210 to the AC load 120 via the second plug 112. When the AC utility input voltage is restored to the first plug 102, the second switch 204 opens and the first switch 202 closes, thereby disconnecting the battery 210. The opening and closing of the first switch 202 and the second switch 204 may be controlled by controller 214 upon sensing the loss and restoration of the AC utility input voltage 100 via a sensing line 216. Other arrangements may also be used as is well known to those having skill in the art. A charger 206 maintains the battery 210 in the charged state. The design and operation of a conventional standby UPS 110' is well known to those having skill in the art, and need not be described further herein.

Unfortunately, a conventional standby UPS 110' may have many shortcomings. For example, in order to avoid backfeed from the standby UPS 110' into the AC utility input voltage 100 via the first plug 102, a delay is preferably applied by the controller 214 so that the first switch 202 opens before the second switch 204 is closed. This makes the switching from the AC utility input voltage 100 to the standby battery 210 a "break before make" transition. The AC load 120 will generally be unpowered during this transition. Moreover, switch 204 may need to be a high-voltage bidirectional switch that is able to block peak input line surge voltage in addition to blocking the inverter voltage. Finally, the DC to AC inverter 212 that supplies power from the battery 210 may need to be fully rated on a continuous basis and may need to be capable of supplying the surge power demands of the AC load on a short-term basis. The DC to AC inverter 212 may also need to provide isolation between the battery and load when the battery is low voltage and ground referenced. Accordingly, the DC to AC inverter 212 may be costly and unreliable.

Examples of online UPSs that include a high-frequency resonant converter are illustrated in U.S. Pat. No. 5,291,383 to the present inventor Oughton that is assigned to the assignee of the present invention. In this patent, FIG. 1 illustrates a block diagram of a UPS system. The UPS system comprises a rectifier connectable to an AC utility power source. The rectifier provides a DC voltage to an input filter, which in turn provides unregulated DC voltage to the input of a high-frequency resonant converter. The resonant converter provides regulated AC voltage at its output to an isolation power transformer. The power transformer includes a primary winding and a secondary winding, with the primary winding and the secondary winding coupling the converter to the rectifier which, through an output filter, supplies DC voltage to a pulse width modulation (PWM) inverter. The PWM inverter furnishes an AC voltage to the load connected to the UPS system through a low pass filter. Appropriate control circuitry is provided for control of the PWM inverter and for control of the resonant converter. The UPS system also includes a battery connectible to the input of the converter through a switch, and a charger for the battery, which charger is also connected to an AC source. See the Oughton patent, Column 1, lines 13–36. See also U.S. Pat. No. 5,057,698 to Widener and the present inventor Oughton.

The above description indicates that UPSs can be costly, complicated and bulky, and prone to reliability problems. Standby UPSs also may not provide seamless transition to the AC load upon loss of the AC utility input voltage.

SUMMARY OF THE INVENTION

It is therefore an object of the present invention to provide improved standby UPS systems and methods that can provide standby and uninterruptible power for AC loads.

It is another object of the present invention to provide systems and methods for producing standby uninterruptible power for an AC load that can reduce the cost, complexity and/or bulk of the components that are used.

It is still another object of the present invention to provide systems and methods for producing standby uninterruptible power for an AC load that can provide seamless transfer of power to the AC load upon failure of the AC utility input voltage and upon restoration of the AC utility input voltage.

These and other objects are provided, according to the present invention, by systems and methods for producing standby uninterruptible power for an AC load, that rectify an AC utility input voltage to produce a rectified voltage and that activate a DC battery voltage in response to a predetermined change in the AC utility input voltage to thereby produce a standby DC voltage. The rectified voltage and the standby DC voltage are connected to an AC load that includes input rectification to thereby produce standby uninterruptible power without the need for costly, bulky, and/or unreliable inverters or converters. Seamless transfer of power may be provided to support the AC load upon failure of the AC utility input voltage and upon restoration of the AC utility input voltage.

The present invention stems from the realization that many AC loads, including but not limited to AC loads that include electronic circuitry and a power supply with input rectification as was described in connection with FIG. 1B, do not need AC power at the input thereof. Rather, many AC loads can operate satisfactorily from a rectified AC source. Accordingly, rather than producing AC power to the AC load when the AC utility input voltage is operational, rectified AC power is produced. Upon failure of the AC utility input voltage, a standby DC voltage is supplied by the battery. The rectified AC voltage and the standby DC voltage can be used satisfactorily by many AC loads that include input rectification. Accordingly, the need for bulky and costly inverters or converters may be eliminated to thereby allow reduced cost, bulk and/or improved reliability of the UPS.

In a preferred embodiment, the AC utility input voltage is rectified using one or more diodes. These diodes can prevent backfeed into the AC utility input voltage so that the standby DC voltage can be applied to the AC load immediately, to thereby provide a seamless transition. A diode switch (i.e., a unidirectional switch) activates and deactivates the battery, so that the battery need not be deactivated until it is assured that the AC utility input voltage has been fully restored. Accordingly, seamless power may be delivered to the load upon restoration of the AC utility input voltage.

In a preferred embodiment of the present invention, the AC utility input voltage is rectified by a diode rectifier, most preferably a full-wave diode rectifier including at least four diodes, to produce the rectified voltage. A diode switch is used to activate the DC voltage from the battery in response to a predetermined change in the AC utility input voltage to thereby produce the standby DC voltage. The diode switch may comprise a separate diode and an electronic or electromechanical switch. Alternatively, the diode switch may be a single element such as a thyristor. The diode rectifier and the diode switch are connected in a diode-OR connection that provides the standby uninterruptible power to the output of the UPS.

The diode-OR connection allows the strongest source to support the AC load at all times. Thus, the switching can be make-before-break to support seamless power to the AC load. Accordingly, a controller can activate the diode switch, to thereby activate the battery in response to failure of the AC utility input voltage, without first disconnecting the AC utility input voltage from the UPS. A seamless transition may thereby be provided. Moreover, the diode-OR connection allows the battery to be activated in response to reduction of the AC utility input voltage due to a brownout or other condition, without the need to wait for a complete failure of the AC utility input voltage. Finally, upon restoration of the AC utility input voltage, the diode-OR connection can eliminate the need to disconnect the battery prior to reconnecting the AC utility input voltage. Rather, both the battery and the AC utility input voltage may be connected concurrently using the diode-OR connection, so that the battery need not be disconnected until it has been assured that the restored AC utility input voltage is stable. Accordingly, systems (apparatus) and methods for producing standby uninterruptible power for an AC load that includes input rectification can provide seamless, low cost, compact, and/or reliable standby uninterruptible power.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figures 3, 3A:
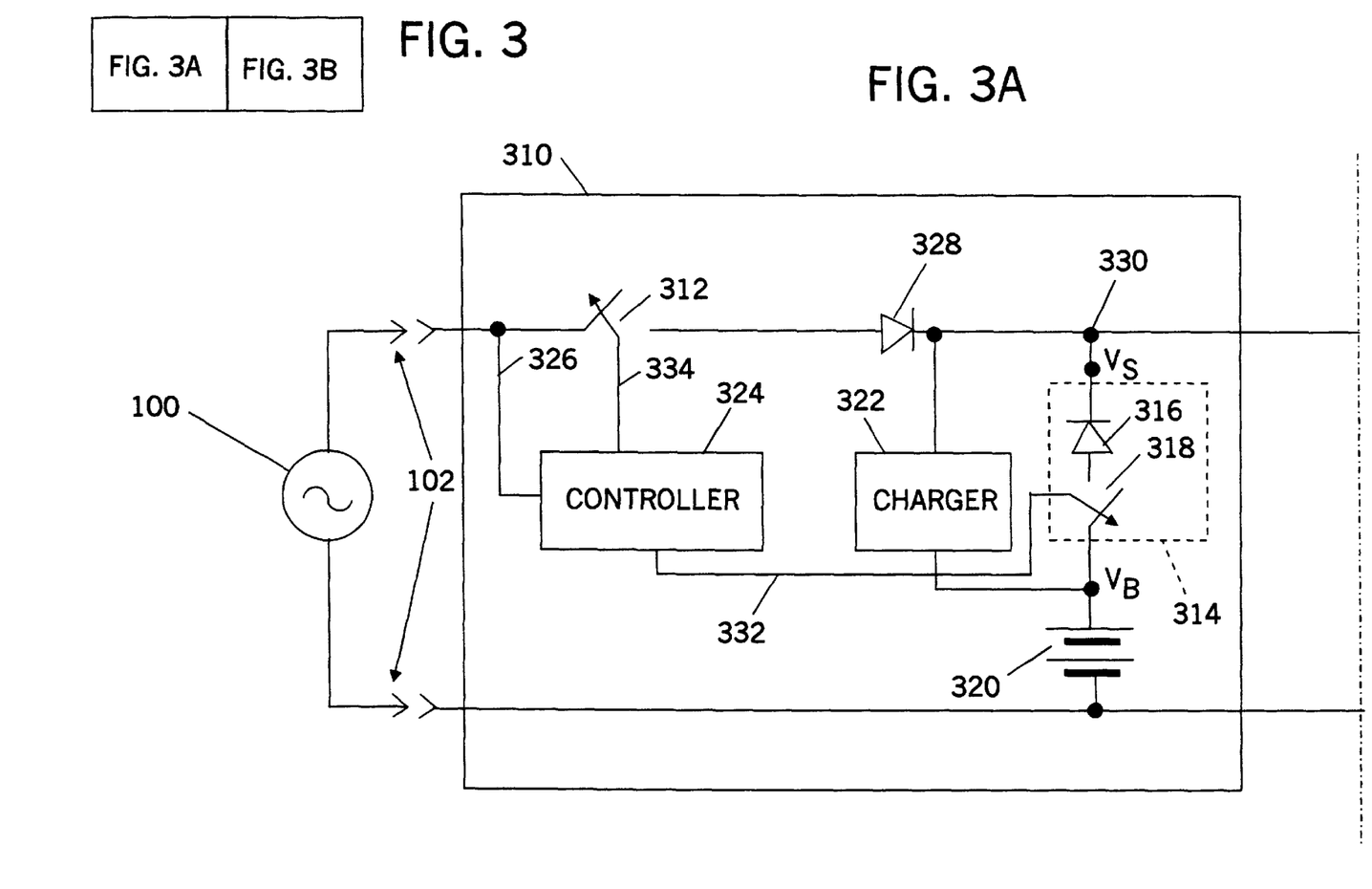
FIG. 3 illustrates first embodiments of UPS systems and methods according to the present invention.
Figure 3B:
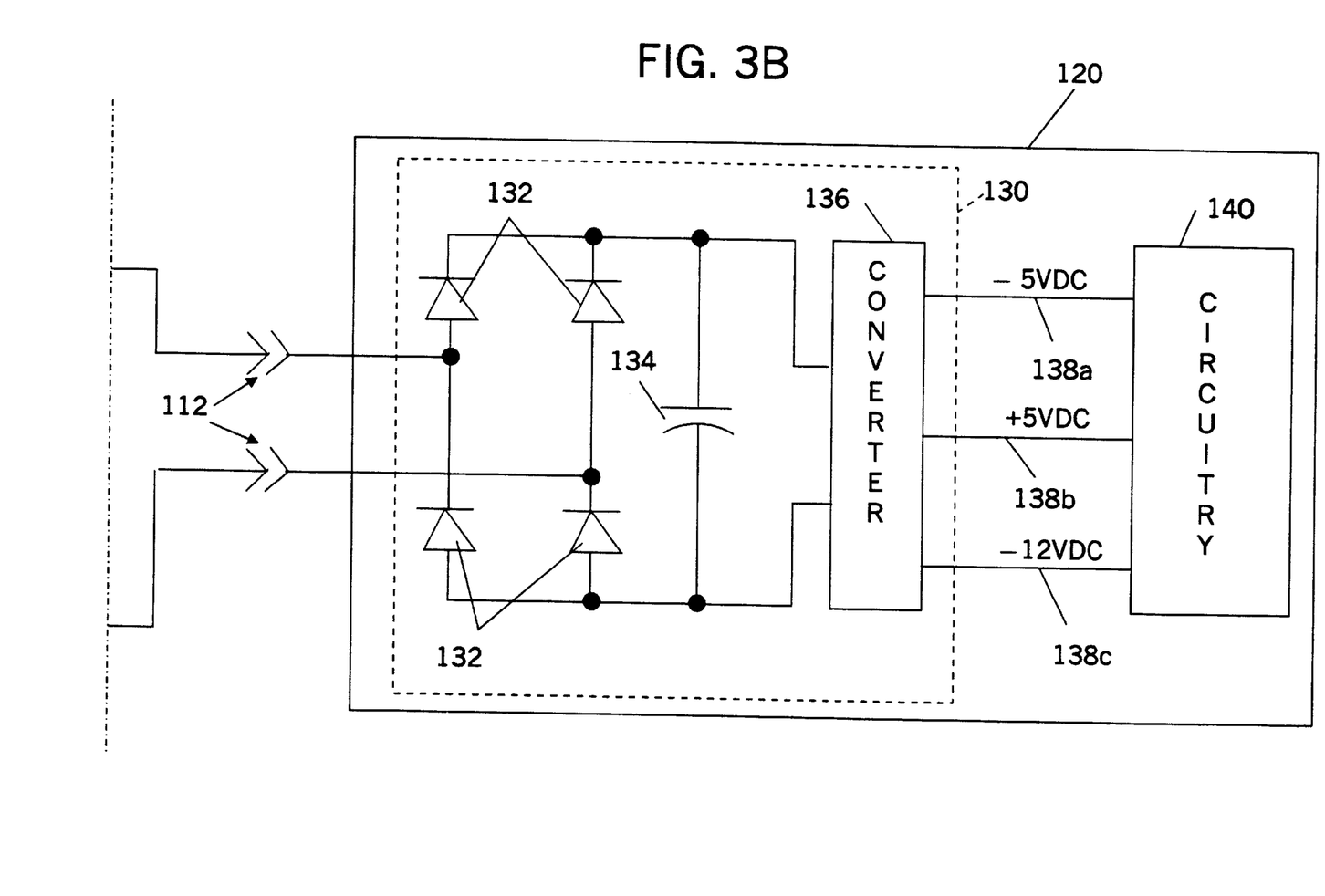

Referring now to FIG. 3, first embodiments of UPS systems and methods of the present invention will now be described. A shown in FIG. 3, the input of a UPS 310 according to the invention is connected to the AC utility input voltage 100 via a first plug 102. The output of the UPS 310 is connected to an AC load 120 via a second plug 112. As was already described, second plug 112 may not be needed if UPS 310 is integrated into the AC load 120.

Continuing with the description of FIG. 3, the UPS 310 includes a diode rectifier, for example a single diode 328, that provides half-wave rectification of the AC utility input voltage 100. A battery 320 and a diode switch 314 are serially connected to the diode rectifier 328 in a diode-OR connection 330. The battery 320 produces a DC voltage $V_B$ that is sufficient to power the AC load 120. When diode switch 314 is active, a standby DC voltage $V_s$ is produced. As is well known to those having skill in the art, a diode-OR connection includes two or more diodes that are connected to a common node so that only one diode can pass current to the common node, and the remaining diodes will block current from the common node. In other words, a unidirectional connection is provided. Thus, in FIG. 3, the diode-OR connection 330 prevents current from the battery 320 from being fed back to the AC utility input voltage 100 and also prevents current from the AC utility input voltage 100 from being fed to the battery 320. The diode-OR connection 330 provides the output of the UPS 310.

The UPS 310 also includes a line switch 312. The line switch 312 may be optional because the diode 328 can prevent backfeed into the AC utility input voltage 100 from the battery 320. However, regulations may require inclusion of a mechanical line switch 312.

In the embodiment of FIG. 3, the diode switch 314 comprises a diode 316 and a switch 318 that are serially connected between the diode-OR connection 330 and the battery 320. The switch 318 may be an electromechanical switch such as a relay. Alternatively, switch 318 can be an electronic switch such as an insulated gate bipolar transistor (IGBT), a power field effect transistor (FET), a bipolar transistor or any other electronic switch. The diode switch 314 provides unidirectional current flow.

Still continuing with the description of FIG. 3, a battery charger 322 is also included to charge the battery 320. The design of the battery charger 322 is well known to those having skill in the art and need not be described herein. Finally, controller 324 senses the AC utility input voltage 100 via a sensing line 326, controls line switch 312 via second control line 334, and controls the switch 318 of the diode switch 314 via first control line 332, as will be described in detail below.

In general however, upon loss of the AC utility input voltage 100, as sensed at sensing line 326, controller 324 can close switch 318 of diode switch 314 immediately, before the line switch 312 is opened, to provide a seamless transfer of power to support the AC load 120. Diode 328 provides unidirectional current conduction, and prevents backfeed to the AC utility input voltage 100. The controller can then open line switch 312 to comply with regulatory requirements that may require a physical opening of a switch when the battery backup is being used. Upon restoration of AC utility input voltage 100, the controller 324 can close line switch 312. Diode switch 314 or 314' provides unidirectional current conduction so that AC utility input voltage 100 does not flow into battery 320. After waiting a predetermined amount of time, switch 318 can be opened once stable line power is assured. It will be understood that controller 324 may be embodied using one or more analog or digital integrated circuits, discrete analog or digital circuits, integrated circuit microprocessors that run a stored program, Application-Specific Integrated Circuits (ASIC) or any other combination of hardware and/or software.

Figures 4, 4A:
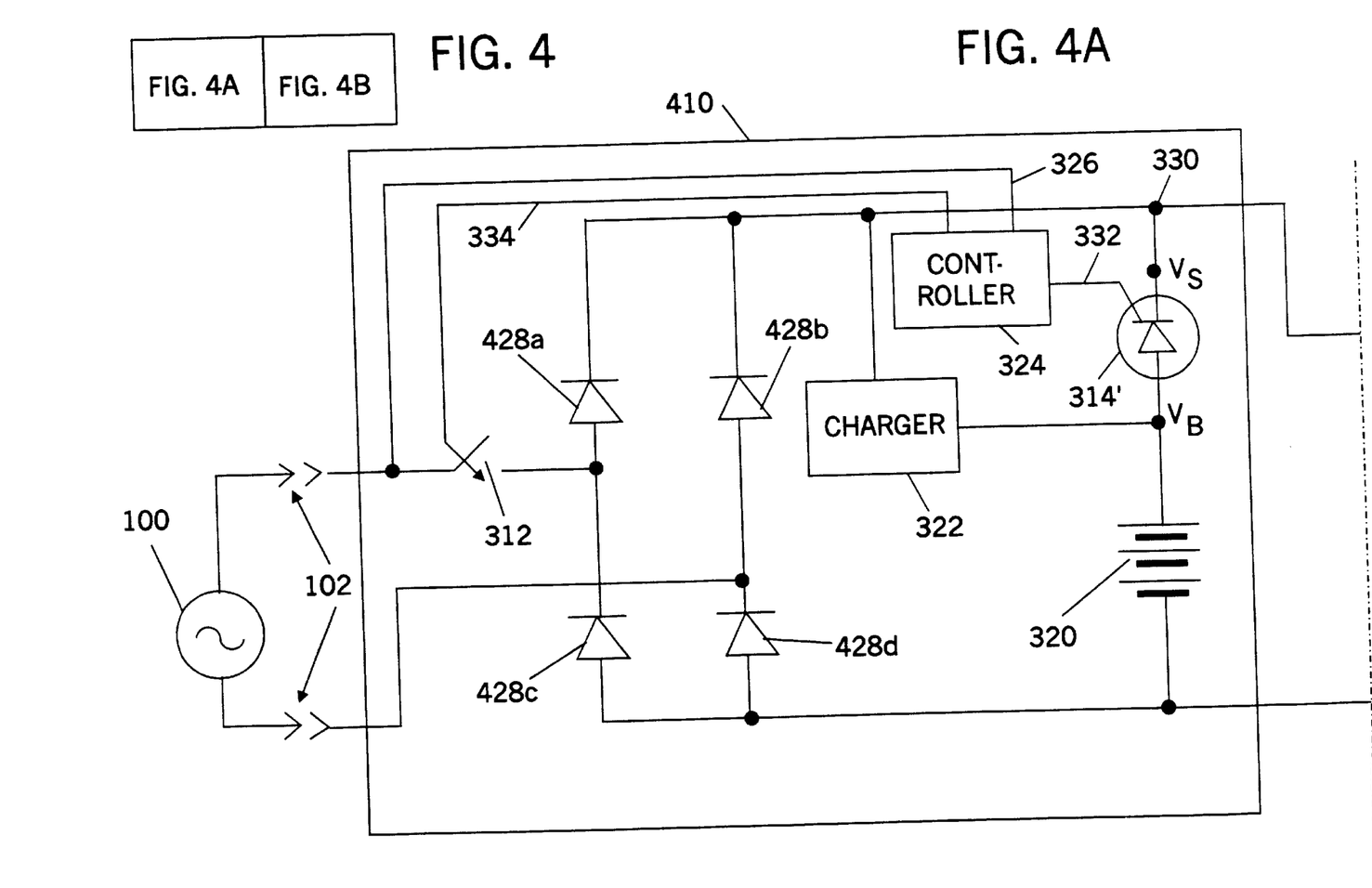
FIG. 4 illustrates second embodiments of UPS systems and methods according to the present invention.
Figure 4B:
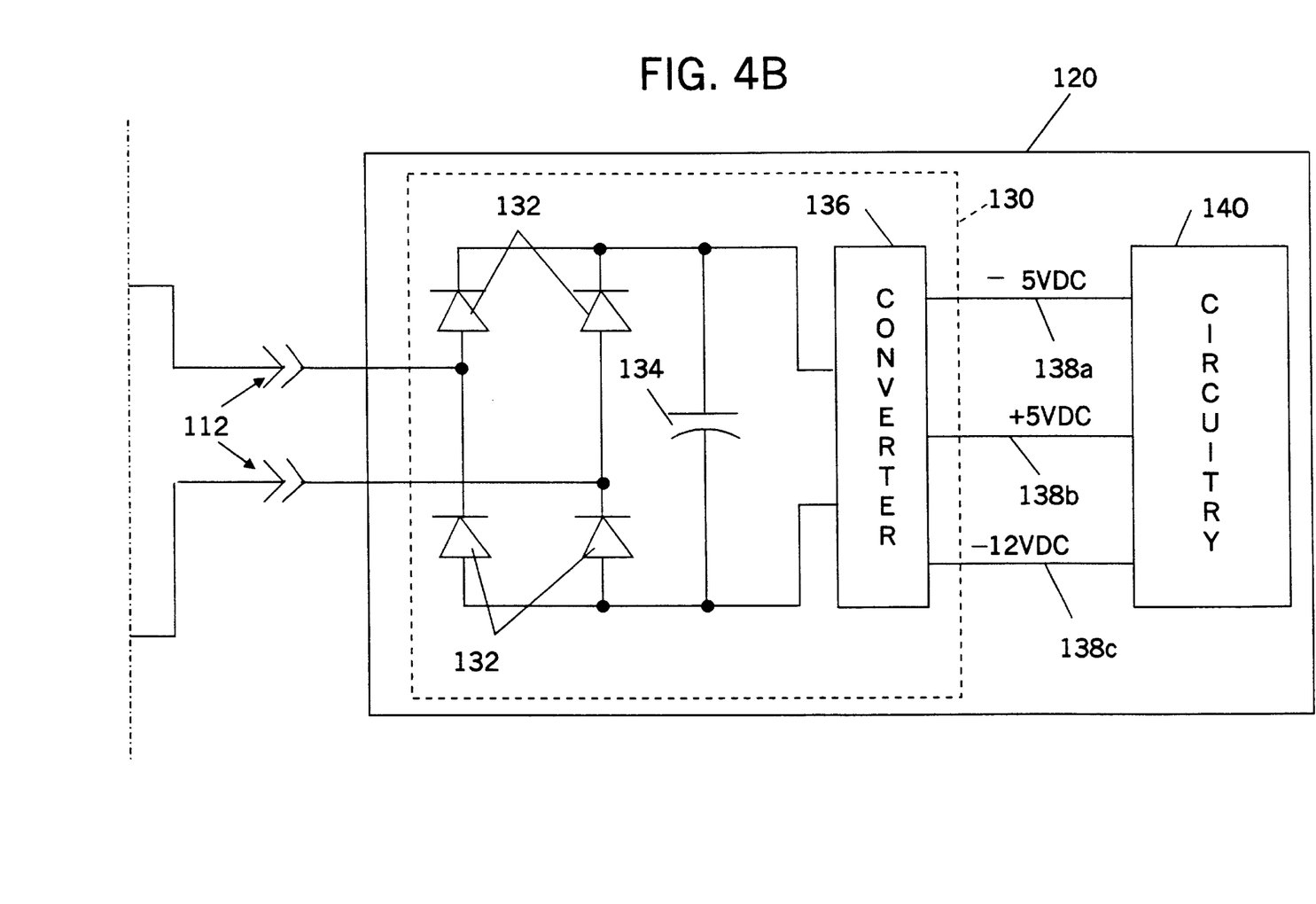

FIG. 4 illustrates second embodiments of the present invention. As shown in FIG. 4, a UPS 410 includes a full-wave diode rectifier comprising four diodes 428a–428d that are connected in a manner well known to those having skill in the art. Moreover, diode switch 314' is an integrated (single element) diode switch, for example a thyristor, that includes a switch and a diode in a single semiconductor device. As in FIG. 3, controller 324 controls thyristor 314' using first line 332. Controller 324 controls line switch 312 using second control line 334.

Figure 5:
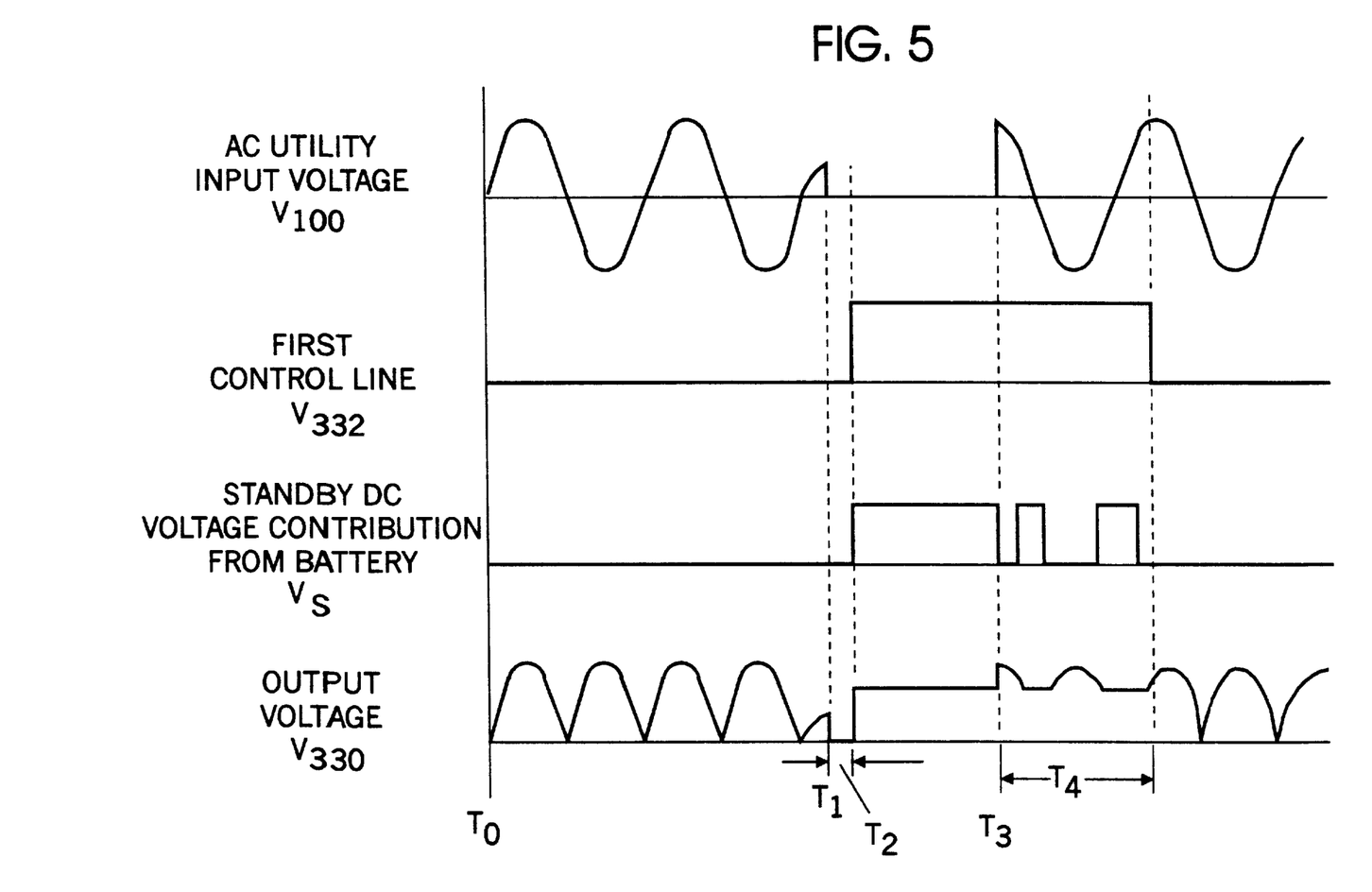
FIG. 5 is a timing diagram illustrating voltages and signals of FIGS. 3 and 4.
Figure 6:
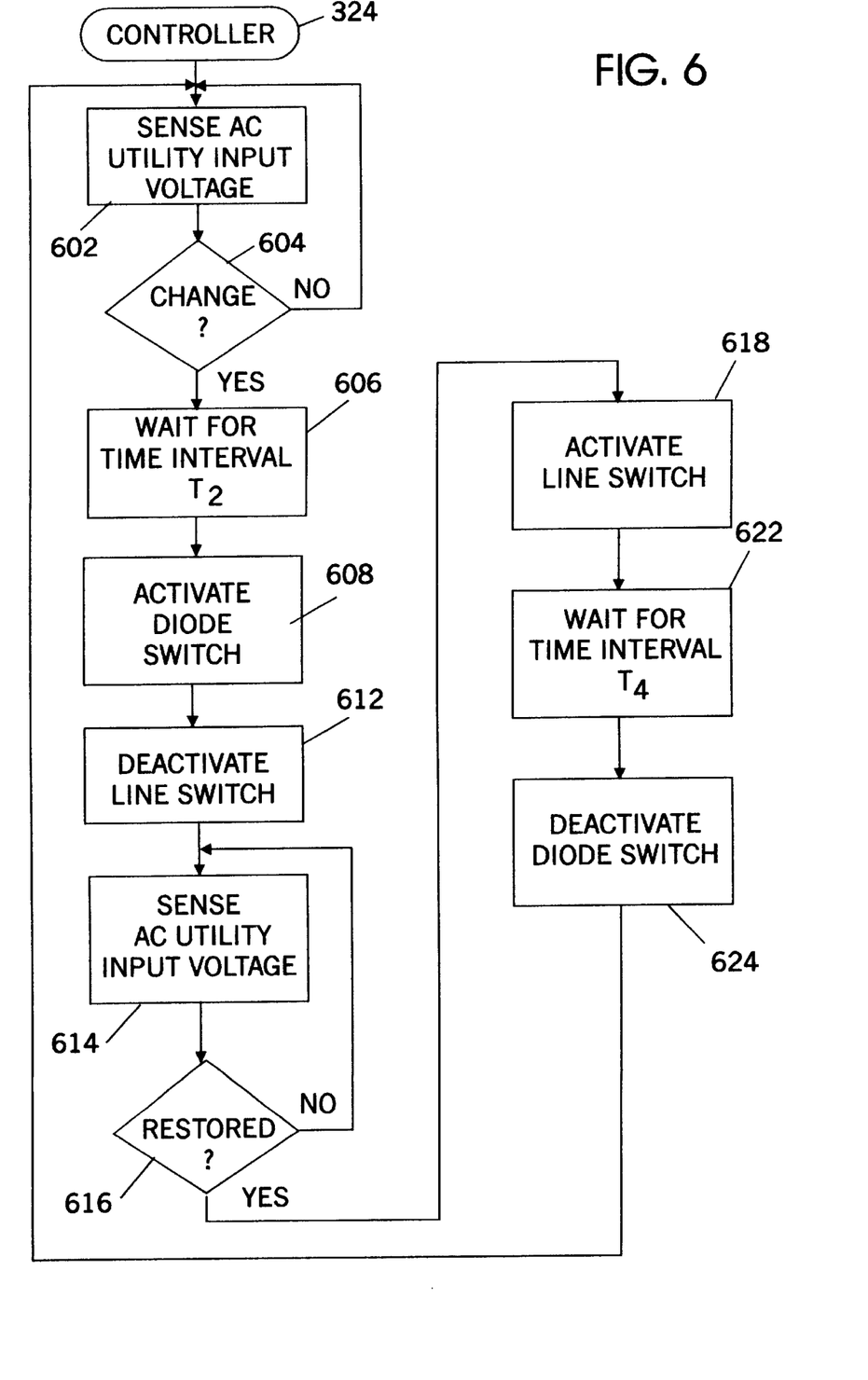
FIG. 6 is a flowchart illustrating operations of controllers of FIGS. 3 and 4.

Referring now to FIGS. 5 and 6, operation of UPSs according to the invention as shown in FIGS. 3 and 4 will now be described. FIG. 5 is a timing diagram illustrating various voltages and signals in UPSs of FIGS. 3 and 4. FIG. 6 is a flow chart illustrating operations of controller 324. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specific functions or steps such as is described in FIG. 6, or by combinations of special purpose hardware and computer instructions.

Referring now to FIGS. 3, 4, 5 and 6, operations begin with the AC utility input voltage 100 providing a normal sinusoidal voltage at first plug 102, also referred to herein as $V_{100}$, from time T0 to time T1. During this time, the controller 324 senses the AC utility input voltage at Block 602 via line 326 until there is a change at Block 604 at time T1. As will be described below, this change can be a failure of the AC utility input voltage 100 due to a power outage or can be a reduction in the AC utility input voltage 100 due to a brownout.

As shown in FIG. 5, from time T0 to time T1, the control signal on first control line 332, designated herein as $V_{332}$, is inactive. Similarly, the standby DC voltage contribution from the battery 320, designated herein as $V_S$, is zero. The output voltage of the UPS 410 at diode-OR connection 330, designated herein as $V_{330}$, is a half-wave rectified AC voltage (FIG. 3) or a full-wave rectified AC voltage (FIG. 4).

Referring back to FIG. 6, when a change in the AC utility input voltage is detected at Block 604 via sensing line 326, controller 324 waits for a time interval T2 to insure that the AC utility input voltage 100 has changed, rather than merely being subject to a voltage spike or dropout. It will be understood that the time interval T2 ay be very small, generally a fraction of a cycle of the AC input voltage. Moreover, the time interval T2 may be minimized, so that it depends only upon the minimum sensing time of the controller 324. Accordingly, for time interval T2, controller voltage $V_{332}$ remains inactive, standby voltage $V_s$ remains at zero, and the output voltage $V_{330}$ also falls to zero.

Referring again to FIG. 6, at Block 608 diode switch 314 or 314' is activated by controller 324 via first control line 332 if the AC utility input voltage $V_{100}$ remains changed for the time interval T2. Accordingly, as shown in FIG. 5, the first control line 332 is activated at the conclusion of time interval T2, to thereby activate the diode switch 314 or 314'. The standby DC voltage $V_s$ therefore increases to its maximum value and the output voltage $V_{330}$ provides DC voltage that preferably is similar to the RMS value of the AC utility input voltage $V_{100}$, or other value that is adequate to power the AC load 120. Optionally, as shown in FIG. 6 at Block 612, the line switch 312 may be deactivated by controller 324 using second control line 334. It will also be understood that the line switch 334 may open due to mechanical action of the line switch 312 itself without controller intervention.

At Block 614, the controller 324 continues to sense the AC utility input voltage $V_{100}$, to sense when AC utility input voltage $V_{100}$ has been restored (Block 616). Referring again to FIG. 5, at time T3, the AC utility input voltage of $V_{100}$ has been restored. In response to sensing the input voltage restoration at Block 616, the line switch 312 may be activated by the controller 324 via the second control line 334, at Block 618. It will also be understood that the line switch 312 may be self-activated upon restoration of the line voltage without requiring activation by controller 324.

Continuing with the description of FIG. 6, at Block 622 the diode switch 314 or 314' is not immediately deactivated. Rather, the controller 324 waits for a time interval T4 to insure that AC utility input voltage $V_{100}$ is stable. During the time interval T4, due to the diode-OR connection 330, diode switch 314 or 314' becomes reverse biased and decouples the DC voltage $V_B$ from battery 320 from the UPS output when the AC utility input voltage 100 exceeds the DC battery voltage $V_B$. Thus, during time interval T4, the battery 320 and the AC utility input voltage 100 alternatingly provide the UPS output voltage at diode-OR connection 320, depending on whether the rectified AC utility input voltage or the DC battery voltage is higher. It will be understood that the above description assumes no voltage drop across diode 316 or diode switch 314'. If there is a voltage drop, the battery 320 and the AC utility input voltage 100 alternatingly provide the output voltage at the diode-OR connection 320, depending on whether the rectified AC utility input voltage, or the DC battery voltage less the voltage drop, is higher.

After time interval T4 has elapsed, and it has been insured that stable AC utility input voltage 100 is present, the diode switch 314 or 314' is deactivated at Block 624. It will be understood that during time interval T4, the restored AC utility input voltage can synchronize to the AC load, without the need for complex phase-locked loops in the UPS. The rectified AC utility input voltage is then supplied by the UPS, and the battery charger 322 recharges the battery 320.

It will be understood that when switch 314' is a thyristor or silicon-controlled rectifier (SCR) as shown in FIG. 4, line commutation may be used to turn off the switch 314' after deactivation of the first control line 332. When switch 318 is a separate switch from diode 316 as shown in FIG. 3, such as an insulated gate bipolar transistor (IGBT) or another electronic or manual switch, the controller 324 can turn off the switch 318 by deactivating first control line 332. Thus, a low voltage dropout may be provided to prevent overdischarge of the battery 320, and the line voltage peak need not exceed the battery voltage to commutate off the switch 314'.

Accordingly, when line loss is detected, the diode switch 314 or 314' may be immediately closed to provide standby power without having to wait for the line switch 312 to open. The line switch can then be opened to further insure that backfeed will not occur. This allows a "make-before-break" transition to be executed to thereby provide seamless power transfer. The battery 320 can preferably support both steady-state and short-term load power demands. Thus, when AC utility input voltage 100 returns, the line switch 312 is closed and the diode switch 314 or 314' becomes reverse biased, thereby naturally decoupling the battery 320 from the AC utility input voltage 100. The diode switch 314 or 314' can then be deactivated once the AC utility input voltage is stable.

Since rectified AC is provided to the UPS output node 330, the diode switch 314 or 314' need only be rated to block the battery voltage $V_B$ rather than being rated to block the battery voltage $V_B$ and the peak AC utility input voltage 100 Thus, compared to the switch 204 of FIG. 2, the diode switch 314 or 314' need not be bidirectional and can be rated to block only a fraction of the voltage that may need to be blocked by switch 204. If low voltage dropout is desired, the diode switch 314 or 314' may comprise an insulated gate bipolar transistor (IGBT) and diode in series, which can allow battery deactivation while in standby mode.

Moreover, battery 320 is preferably of appropriately high voltage so that there is no need to use the DC to AC inverter 212 of FIG. 2. The battery 320 can inherently provide short-term overload capability for load in-rush or other short-term loads. In contrast, if a DC to DC converter is included in the DC to AC inverter 212 of FIG. 2, it may need to be rated to support not only steady state power but also short-term overload demands as well.

The DC (unipolar) output of the present invention is compatible with power supplies that include input rectification, as are commonly used with many electronic circuits. Since power line frequency filtering need not be performed, the present invention need not interfere with low harmonic distortion/power factor corrected power supplies. When used with power supplies incorporating power factor correction and/or harmonic reduction techniques, the power factor correction in the power supply can be used to boost a moderate battery voltage to the voltage that is used by the power supply. Thus, a 100–120 volt battery 320 can support a 100–240V RMS power supply 120 that includes power factor correction. If power factor correction is not included, a 240V battery 320 may be used.

It will also be understood that no additional electromagnetic interference (EMI) need be generated by the present invention because high frequency inverters and/or converters need not be used. The charger 322 may generate a low level of EMI that is conventionally much lower than that generated by inverters or converters, and that can be filtered at the charger without the need to provide a filter that is designed to carry the full load current of the UPS. High efficiency and low losses in the invention can provide operation without the need for a fan or extraordinary ventilation. This may facilitate integrating a UPS with an AC load.

Finally, as was illustrated in time interval T4 of FIG. 5, a natural sharing of load power can occur according to the present invention. Accordingly, during a brownout, when the AC utility input voltage is still present at reduced levels, the AC utility input voltage can provide the output of a UPS when its voltage is greater than battery voltage $V_B$ (less any voltage drops in diode switches 314 or 314'). However, when battery voltage $V_B$ is higher than AC utility input voltage 100, the battery 320 can supply the output voltage of the UPS. This may be beneficial during extended brownout conditions wherein battery power need be consumed only for the portion of time that the AC utility input voltage falls below the battery voltage. This can greatly extend the available backup time during a brownout.

Since the present invention produces rectified AC voltage when the AC utility input voltage is present, the input power cord for the AC load 120 may need to be modified or replaced to provide a power cord that is rated to safely carry the rectified AC that includes a DC component. Thus, for AC loads that use IEC320 power cords that are rated at 250V, either AC or DC power may be carried by these cords. However, for NEMA power cords, a DC NEMA power cord may need to be substituted for a conventional AC NEMA power cord. This DC NEMA power cord may be provided along with UPSs according to the present invention to facilitate installation and to comply with regulatory requirements.

It will also be understood that by providing rectified AC voltage to the power supply 130, the present invention may only cause two of the four diodes 132 in the power supply 130 to conduct, thereby potentially increasing power dissipation and reducing the mean-time-to-failure of these two diodes. However, since all four diodes 132 are conventionally packaged in a single electronic package, the increase in power dissipation and the reduction in mean-time-to-failure for the four-diode electronic package may be minimal.

In conclusion, a rectified voltage is applied to AC loads that include input rectification, that are traditionally powered from an AC utility input voltage. A battery that is sufficient to power the AC load directly is diode-ORed to allow battery power to be fed directly to the AC load whenever the AC utility input voltage is insufficient to power the AC load. Seamless power to the AC load may be provided, and a traditional inverter and/or converter between the battery and the AC load can be eliminated. Standby UPSs and methods according to the invention can therefore be more rugged, can have higher reliability, better performance and/or lower cost than conventional standby UPSs.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A standby Uninterruptible Power Supply (UPS) comprising:

means for rectifying an alternating current (AC) utility input voltage to produce a rectified voltage;

a battery that produces a direct current (DC) voltage;

means for activating the DC voltage in response to a predetermined change in the AC utility input voltage to thereby produce a standby DC voltage; and means for connecting the rectified voltage and the standby DC voltage to an AC load that includes input rectification such that the rectified voltage is applied to the AC load that includes input rectification when the AC utility input voltage is operational and the standby DC voltage is applied to the AC load that includes input rectification in response to the predetermined change in the AC utility input voltage.

2. A standby UPS according to claim 1 wherein the means for rectifying comprises a diode rectifier.

3. A standby UPS according to claim 2 wherein the means for activating comprises a diode and a switch.

4. A standby UPS according to claim 3 wherein the diode and switch comprise a thyristor.

5. A standby UPS according to claim 3 wherein the switch comprises an electronic switch or an electromechanical switch.

6. A standby UPS according to claim 1 wherein the means for activating comprises means for activating the DC voltage in response to failure of the AC utility input voltage to thereby produce the standby DC voltage.

7. A standby UPS according to claim 1 wherein the means for activating comprises means for activating the DC voltage in response to failure of the AC utility input voltage for a predetermined time to thereby produce the standby DC voltage.

8. A standby UPS according to claim 1 wherein the means for activating comprises means for activating the DC voltage in response to reduction of the AC utility input voltage to thereby produce the standby DC voltage.

9. A standby UPS according to claim 1 wherein the means for connecting comprises means for connecting the rectified voltage and the standby DC voltage to an AC power supply that includes input rectification.

10. A method of producing standby uninterruptible power for an AC load that includes input rectification, comprising the steps of:

rectifying an alternating current (AC) utility input voltage to produce a rectified voltage;

activating a direct current (DC) battery voltage in response to a predetermined change in the AC utility input voltage to thereby produce a standby DC voltage; and connecting the rectified voltage and the standby DC voltage to the AC load that includes input rectification such that the rectified voltage is applied to the AC load that includes input rectification when the AC utility input voltage is operational and the standby DC voltage is applied to the AC load that includes input rectification in response to the predetermined change in the AC utility input voltage.

11. A method according to claim 10 wherein the rectifying step comprises the step of diode rectifying the AC utility input voltage to produce the rectified voltage.

12. A method according to claim 11 wherein the activating step comprises the step of unidirectionally activating the DC battery voltage in response to the predetermined change in the AC utility input voltage to thereby produce the standby DC voltage.

13. A method according to claim 10 wherein the activating step comprises the step of activating the DC battery voltage in response to failure of the AC utility input voltage to thereby produce the standby DC voltage.

14. A method according to claim 13 wherein the activating step comprises the step of activating the DC battery voltage in response to failure of the AC utility input voltage for a predetermined time to thereby produce the standby DC voltage.

15. A method according to claim 10 wherein the activating step comprises the step of activating the DC battery voltage in response to reduction of the AC utility input voltage to thereby produce the standby DC voltage.

16. A method according to claim 10 wherein the connecting step comprises the step of connecting the rectified voltage and the standby DC voltage to an AC power supply that includes rectification at the input thereof.

17. A standby Uninterruptible Power Supply (UPS) that produces uninterruptible power at the output thereof, comprising:
a rectifier that rectifies an alternating current (AC) utility input voltage to produce a rectified voltage;
a battery that produces a direct current (DC) voltage; and
a switch that is connected to the battery to produce a standby DC voltage from the battery in response to a predetermined change in the AC utility input voltage, the rectifier and the switch being connected to the output of the UPS to thereby provide the rectified voltage and the standby DC voltage at the output of the UPS such that when the output of the UPS is connected to an AC load, the rectified voltage is applied to the AC load when the AC utility input voltage is operational and the standby DC voltage is applied to the AC load in response to the predetermined change in the AC utility input voltage.

18. A standby UPS according to claim 17 wherein the rectifier comprises a diode rectifier.

19. A standby UPS according to claim 17 wherein the diode rectifier comprises a full wave diode rectifier.

20. A standby UPS according to claim 19 wherein the switch comprises a diode switch.

21. A standby UPS according to claim 20 wherein the diode switch comprises a thyristor.

22. A standby UPS according to claim 20 wherein the diode switch comprises a diode in series with an electronic switch or an electromechanical switch.

23. A standby UPS according to claim 17 further comprising a controller that is connected to the switch, that activates the switch to produce the standby voltage from the battery in response to the predetermined change in the AC utility input voltage.

24. A standby UPS according to claim 23 wherein the controller activates the switch in response to failure of the AC utility input voltage to thereby produce the standby DC voltage.

25. A standby UPS according to claim 23 wherein the controller activates the switch in response to failure of the AC utility input voltage for a predetermined time to thereby produce the standby DC voltage.

26. A standby UPS according to claim 23 wherein the controller activates the switch in response to reduction of the AC utility input voltage to thereby produce the standby DC voltage.

27. A standby UPS according to claim 17 wherein the output of the standby UPS is connected to an AC power supply that includes input rectification.

28. A method of producing standby uninterruptible power for an AC load at an output node, comprising the steps of:
rectifying an alternating current (AC) utility input voltage to produce a rectified voltage;
activating a direct current (DC) battery voltage in response to a predetermined change in the AC utility input voltage to thereby produce a standby DC voltage; and
connecting the rectified voltage and the standby DC voltage to the output node such that when the output of the UPS is connected to an AC load, the rectified voltage is applied to the AC load when the AC utility input voltage is operational and the standby DC voltage is applied to the AC load in response to the predetermined change in the AC utility input voltage.

29. A method according to claim 28 wherein the rectifying step comprises the step of diode rectifying the AC utility input voltage to produce the rectified voltage.

30. A method according to claim 29 wherein the activating step comprises the step of unidirectionally activating the DC battery voltage in response to the predetermined change in the AC utility input voltage to thereby produce the standby DC voltage.

31. A method according to claim 28 wherein the activating step comprises the step of activating the DC battery voltage in response to failure of the AC utility input voltage to thereby produce the standby DC voltage.

32. A method according to claim 31 wherein the activating step comprises the step of activating the DC battery voltage in response to failure of the AC utility input voltage for a predetermined time to thereby produce the standby DC voltage.

33. A method according to claim 28 wherein the activating step comprises the step of activating the DC battery voltage in response to reduction of the AC utility input voltage to thereby produce the standby DC voltage.

34. A method according to claim 28 wherein the connecting step is followed by the step of further connecting the output node to an AC power supply that includes rectification at the input thereof.

35. A standby Uninterruptible Power Supply (UPS) that provides standby uninterruptible power at the output thereof, comprising:
a diode rectifier that rectifies an alternating current (AC) utility input voltage; and
a battery and a diode switch that are serially connected to the diode rectifier in a diode-OR connection, the diode switch being responsive to a predetermined change in the AC utility input voltage, the diode-OR connection providing the standby uninterruptible power for the UPS at the output thereof such that when the diode-OR connection is connected to an AC load, the diode rectifier supplies rectified AC utility input voltage to the AC load when the AC utility input voltage is operational and the battery is applied to the AC load in response to the predetermined change in the AC utility input voltage.

36. A standby UPS according to claim 36 wherein the diode rectifier comprises a full wave diode rectifier.

37. A standby UPS according to claim 35 wherein the diode switch comprises a thyristor.

38. A standby UPS according to claim 35 wherein the diode switch comprises a diode in series with an electronic switch or an electromechanical switch.

39. A standby UPS according to claim 35 further comprising a controller that is connected to the diode switch, and that activates the diode switch in response to the predetermined change in the AC utility input voltage.

40. A standby UPS according to claim 39 wherein the controller activates the diode switch in response to failure of the AC utility input voltage.

41. A standby UPS according to claim 39 wherein the controller activates the diode switch in response to failure of the AC utility input voltage for a predetermined time.

42. A standby UPS according to claim 39 wherein the controller activates the switch in response to reduction of the AC utility input voltage for a predetermined time.

43. A standby UPS according to claim 35 wherein the output of the standby UPS is connected to an AC power supply that includes input rectification.

44. A method of controlling a standby Uninterruptible Power Supply (UPS) that includes a diode rectifier that rectifies an alternating current (AC) utility input voltage, and a battery and a diode switch that are serially connected to the diode rectifier in a diode-OR connection, the method comprising the steps of:

sensing a change in the AC utility input voltage;

waiting for a first predetermined time;

activating the diode switch after the first predetermined time if the sensed change in the AC utility input voltage persists;

sensing for restoration of the AC utility input voltage;

waiting for a second predetermined time that is substantially longer than the first predetermined time; and deactivating the diode switch after the second expiration time if the sensed restoration in the AC utility input voltage persists.

45. A method according to claim 44 wherein the step of sensing a change comprises the step of sensing a failure of the AC utility input voltage.

46. A method according to claim 44 wherein the step of sensing a change comprises the step of sensing a reduction in the AC utility input voltage.

47. A method according to claim 44 wherein the first predetermined time is a fraction of a cycle of the AC utility input voltage and wherein the second predetermined time is a plurality of cycles of the AC utility input voltage.

48. A method according to claim 44 wherein the UPS further includes a line switch between the AC utility input voltage and the diode rectifier:

wherein the activating step is followed by the step of deactivating the line switch; and wherein the step of deactivating the diode switch is preceded by the step of activating the line switch.

49. A standby Uninterruptible Power Supply (UPS) comprising:

means for rectifying an alternating current (AC) utility input voltage to produce a rectified voltage;

a battery that produces a direct current (DC) voltage;

means for activating the DC voltage in response to a predetermined change in the AC utility input voltage to thereby produce a standby DC voltage; and means for producing at least one DC operational voltage for a load from the rectified voltage and the standby DC voltage such that when the DC operational voltage is connected to an AC load, the rectified voltage is applied to the AC load when the AC utility input voltage is operational and the standby DC voltage is applied to the AC load in response to the predetermined change in the AC utility input voltage.

50. A standby UPS according to claim 49 wherein the means for rectifying comprises a diode rectifier.

51. A standby UPS according to claim 50 wherein the means for activating comprises a diode and a switch.

52. A standby UPS according to claim 51 wherein the diode and switch comprise a thyristor.

53. A standby UPS according to claim 51 wherein the switch comprises an electronic switch or an electromechanical switch.

54. A standby UPS according to claim 49 wherein the means for activating comprises means for activating the DC voltage in response to failure of the AC utility input voltage to thereby produce the standby DC voltage.

55. A standby UPS according to claim 49 wherein the means for activating comprises means for activating the DC voltage in response to failure of the AC utility input voltage for a predetermined time to thereby produce the standby DC voltage.

56. A standby UPS according to claim 49 wherein the means for activating comprises means for activating the DC voltage in response to reduction of the AC utility input voltage to thereby produce the standby DC voltage.

57. A method of producing standby uninterruptible power, comprising the steps of:

rectifying an alternating current (AC) utility input voltage to produce a rectified voltage;

activating a direct current (DC) battery voltage in response to a predetermined change in the AC utility input voltage to thereby produce a standby DC voltage; and producing at least one DC operational voltage for a load from the rectified voltage and the standby DC voltage such that when the DC operational voltage is connected to an AC load, the rectified voltage is applied to the AC load when the AC utility input voltage is operational and the standby DC voltage is applied to the AC load in response to the predetermined change in the AC utility input voltage.

58. A method according to claim 57 wherein the rectifying step comprises the step of diode rectifying the AC utility input voltage to produce the rectified voltage.

59. A method according to claim 58 wherein the activating step comprises the step of unidirectionally activating the DC battery voltage in response to the predetermined change in the AC utility input voltage to thereby produce the standby DC voltage.

60. A method according to claim 57 wherein the activating step comprises the step of activating the DC battery voltage in response to failure of the AC utility input voltage to thereby produce the standby DC voltage.

61. A method according to claim 60 wherein the activating step comprises the step of activating the DC battery voltage in response to failure of the AC utility input voltage for a predetermined time to thereby produce the standby DC voltage.

62. A method according to claim 57 wherein the activating step comprises the step of activating the DC battery voltage in response to reduction of the AC utility input voltage to thereby produce the standby DC voltage.

* * * * *